United States Patent [19]
Druskina et al.

[11] 3,936,390
[45] Feb. 3, 1976

[54] THERMOPHOSPHOR BASED ON LITHIUM FLUORIDE

[76] Inventors: Lidiya Semenovna Druskina, Nevsky prospekt 150, kv. 93; Iosif Khaimovich Shaver, prospekt Smirno-va, 59, kv. 153, both of Leningrad, U.S.S.R.

[22] Filed: June 20, 1973

[21] Appl. No.: 371,695

[30] Foreign Application Priority Data
June 27, 1972 U.S.S.R............................. 1801804

[52] U.S. Cl. ........................................ 252/301.4 H
[51] Int. Cl............................................. C09k 1/06
[58] Field of Search ............................. 252/301.4 H

[56] References Cited
UNITED STATES PATENTS
3,320,180  5/1967  Swinehart.................... 252/301.4 H

OTHER PUBLICATIONS

Erdey et al., "Acta Chim. Hung Tomus", 45, 1965, pp. 99–100.

Pisarenko et al., "Chemical Abstracts", Vol. 73, 1970, 114764q.

Myakishev et al., "Chemical Abstracts", Vol. 61, 1964, 1496d.

*Primary Examiner*—Jack Cooper
*Attorney, Agent, or Firm*—Holman & Stern

[57] ABSTRACT

A thermophospher based on lithium fluoride which exhibits tissue-equivalence property is disclosed. In addition to the lithium fluoride, the phosphor contains cerium in an amount of up to 0.1 weight percent and calcium in an amount of up to 3 weight percent.

3 Claims, 4 Drawing Figures

THERMOPHOSPHOR BASED ON LITHIUM FLUORIDE

The present invention relates to materials for dosimeter measurements and more particularly, to thermophosphors based on lithium fluoride; it may find application in both personal monitoring and in various radiobiological experiments.

Phosphors based on lithium fluoride are widely known in the art and usually incorporate two activators, one of them being magnesium having a concentration of up to 0.6 wt., and the other, calcium having a concentration of up to 0.5 wt.%. Another efficient phosphor is one based on lithium fluoride having additions of calcium with a concentration of up to 3 wt.% and manganese having a concentration of up to 0.3 wt.%. In some cases three activators, such as magnesium, calcium and titanium, are incorporated into the phosphor based on lithium fluoride. Phosphors based on lithium fluoride having additions of one of the elements selected from the group consisting of magnesium, calcium and barium, and one of the elements selected from the group consisting of aluminum, titanium and europium are likewise known in the art.

Phosphors based on lithium fluoride have found wide application in dosimetry due to a number of unique properties which they exhibit. One of these properties is the socalled tissue-equivalence. The term "tissue-equivalence" is used by us to denote the similarlity in the sensitivity to ionizing radiation exhibited by a given phosphor and by soft biological tissues. This can be explained by the fact that the effective atomic number of lithium fluoride is 8.14 and that of soft tissues is around 7.42. Moreover, a phosphor based on lithium fluoride provides for the possibility of measurements to be carried out within a wide range of doses and, in addition, it is inert, non-toxic and insensitive to light.

However, the practical lower limit of the measured doses for these phosphors is from $10^{-2} - 10^{-3}$ $r$, and with the thermoluminescence spectrum being in the visible range.

In the practice of dosimetry phosphors based on calcium fluoride activated with manganese may be employed and these are based on calcium sulphate activated with manganese or samarium. The thermoluminescence yield of such phosphors is higher than that of phosphors based on lithium fluoride. A disadvantage of these phosphors resides in that due to the relatively high effective atomic number thereof their sensitivity to ionizing radiation sharply increases with a decrease of radiation energy lower than 300 keV. The thermoluminescence spectrum is in the visible range.

It is an object of the present invention to provide a thermophosphor based on lithium fluoride featuring a high sensitivity to ionizing radiation and a thermoluminescence spectrum in the ultraviolet range.

The said object of the invention is attained by providing a thermophosphor based on lithium fluoride doped with calcium, which phosphor according to the invention, also comprises up to 0.1 wt.% of cerium.

The introduction of calcium in combination with cerium into the composition of the thermophosphor ensures a high sensitivity of the phosphor to ionizing radiation and which may produce a thermoluminescence spectrum in the ultraviolet range, which is essential for measuring small doses of ionizing radiation, since this allows for the separation of the useful thermoluminescent signal from the thermal radiation of the heating system and from the phosphor.

With an increase in the concentration of calcium, the tissue-equivalent properties of the thermophosphor are reduced, while its sensitivity becomes higher. With an increase in the concentration of cerium the sensitivity of the thermoluminophor increases, reaches its maximum and then decreases.

Therefore, optimum concentrations (in weight percent) of calcium and cerium of 1 – 3 and 0.015 – 0.06, respectively, are selected with the view of ensuring the conditions for attaining a high sensitivity of the thermophosphor and, at the same time, exhibiting an insignificant change in the tissue-equivalent properties thereof.

For a better understanding of the present invention, given hereinbelow is a description of the present phosphor, exemplified in conjunction with the accompanying drawings, in which.

EXAMPLE 1

A powder of lithium fluoride is taken, and to which lithium fluoride 5.85 wt.% of calcium fluoride, and 0.02 wt.% of cerium fluoride are added. The mixture is kept under a vacuum at a temperature of about 900°C for 30 minutes and is then rapidly cooled. The resulting sinter is particulated into grains of up to 100 mcm in size. The powder is pressed to produce pellets about 70 mg/sq.cm thick.

The thermophosphor thus prepared contains 3 wt.% of calcium and 0.015 wt.% of cerium.

Figure 1:
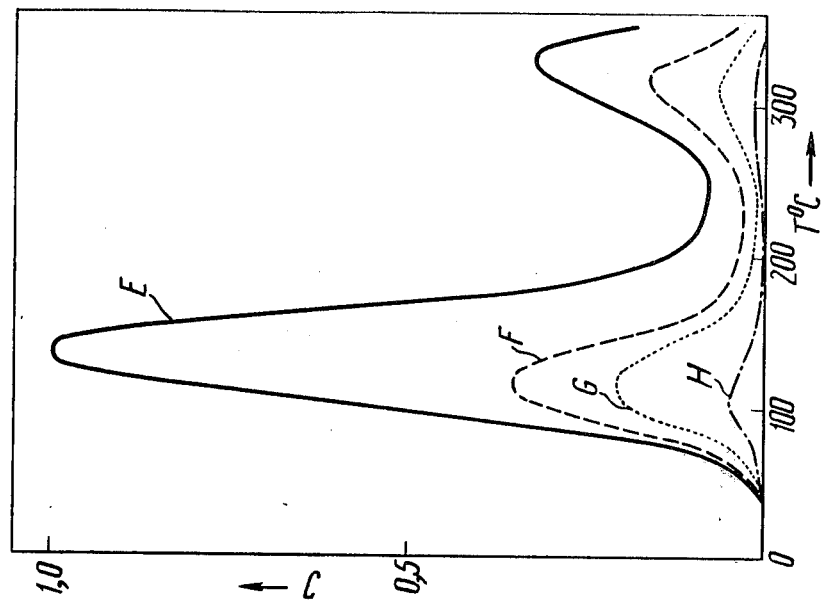
FIG. 1 shows the thermoluminescence curves of powdered phosphors depending on the concentration of cerium with the concentration of calcium being constant, the temperature T°C being plotted on the X-axis and the luminescence intensity $\tau$ in relative units being plotted on the Y-axis.

The thermoluminescence curve A of the X-rayed thermophosphor of Example 1 is shown in FIG. 1.

EXAMPLE 2

The procedure for preparing the thermophosphor is the same as in Example 1, the only difference residing in the addition of 5.85 wt.% of calcium fluoride and 0.04 wt.% of cerium fluoride to the lithium fluoride.

The thermophosphor thus prepared contains 3 wt.% of calcium and 0.03 wt.% of cerium.

The thermoluminescence curve B of the X-rayed thermophosphor of Example 2 is shown in FIG. 1.

EXAMPLE 3

The procedure for preparing the thermophosphor is the same as in Example 1, the only difference residing in the addition of 5.85 wt.% of calcium fluoride and 0.08 wt.% of cerium fluoride to the lithium fluoride.

The thermophosphor thus prepared contains 3 wt.% of calcium and 0.06 wt.% of cerium.

The thermoluminescence curve C of the X-rayed thermophosphor of Example 3 is shown in FIG. 1.

EXAMPLE 4

The procedure for preparing the thermophosphor is the same as in Example 1, the only difference residing in the addition of 5.85 wt.% of calcium fluoride and 0.13 wt.% of cerium fluoride to the lithium fluoride.

The thermophosphor thus prepared contains 3 wt.% of calcium and 0.1 wt.% of cerium.

The thermoluminescence curve D of the X-rayed thermophosphor of Example 4 is shown in FIG. 1.

EXAMPLE 5

The procedure for preparing the thermophosphor is the same as in Example 1, the only difference residing in the addition of 5.85 wt.% of calcium fluoride and 0.05 wt.% of cerium fluoride to the lithium fluoride.

The thermophosphor thus prepared contains 3 wt.% of calcium and 0.04 wt.% of cerium.

Figure 2:
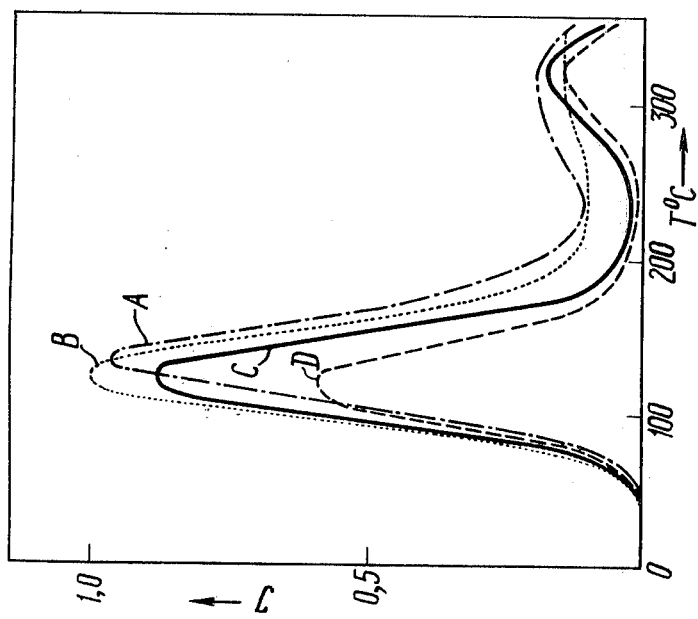
FIG. 2 shows the thermoluminescence curves of powdered phosphors depending on the concentration of calcium with the concentration of cerium being constant, the temperature T°C being plotted on the X-axis and with the luminescence intensity $\tau$ in relative units being plotted on the Y-axis.

The thermoluminescence curve E of the X-rayed thermophosphor of Example 5 is shown in FIG. 2.

EXAMPLE 6

The procedure for preparing the thermophosphor is the same as in Example 1, the difference residing in the addition of 2.93 wt.% of calcium fluoride and 0.05 wt.% of cerium fluoride to the lithium fluoride.

The thermophosphor thus prepared contains 1.5 wt.% of calcium and 0.04 wt.% of cerium.

The thermoluminescence curve F of the X-rayed thermophosphor of Example 6 is shown in FiG. 2.

EXAMPLE 7

The procedure for preparing the thermophosphor is the same as in Example 1, the only difference residing in the addition of 1.95 wt.% of calcium fluoride and 0.05 wt.% of cerium fluoride to the lithium fluoride.

The thermophosphor thus prepared contains 1.0 wt.% of calcium and 0.04 wt.% of cerium.

The thermoluminescence curve G of the X-rayed phosphor of Example 7 is shown in FIG. 2.

EXAMPLE 8

The procedure for preparing the thermophosphor is the same as in Example 1, the only difference residing in the addition of 0.98 wt.% of calcium fluoride and 0.05 wt.% of cerium fluoride to the lithium fluoride.

The thermophosphor thus prepared contains 0.5 wt.% of calcium and 0.04 wt.% of cerium.

The thermoluminescence curve H of the X-rayed thermophosphor of Example 8 is shown in FIG. 2.

As can be seen from the family of curves presented in FIG. 1, with an increase in the concentration of cerium with the concentration of calcium being constant, the luminescence intensity increases, reaches a maximum, and then decreases.

As can be seen from the family of the curves presented in FIG. 2, exhibiting a decrease in the concentration of calcium, with the concentration of cerium being constant, the luminescence intensity decreases.

The thermoluminescence curves presented in FIG. 1 and FIG. 2 are obtained with a heating rate of the phosphor being equal to 1°C per second.

Figure 3:
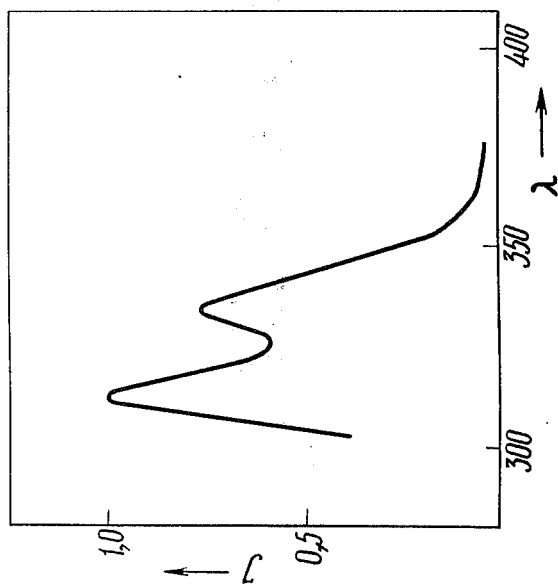
FIG. 3 shows the thermoluminescence spectrum of the phosphor, with the wavelength $\lambda$ in nm being plotted on the X-axis, and the luminescence intensity $\tau$ in relative units being plotted on the Y-axis.

The phosphors of Examples 1 – 8 have a radiation spectra which is limited within a 300 – 350 nm range of wavelengths and contain two overlapping bands with the maxima about 315 and 335 nm. A typical radiation spectrum is shown in FIG. 3.

The preservation of the light sum of the X-rayed phosphors of Examples 1 – 8 depends on the position of the maxima of the thermoluminescence curve. Since the main band of the thermoluminescence curve is one of low-temperature, it is responsible for the largest contribution of fading during the storage period of the X-rayed phosphor.

Figure 4:
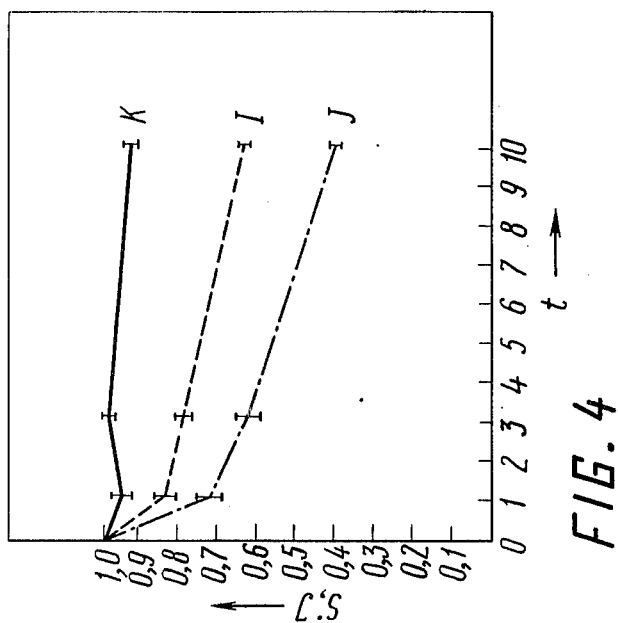
FIG. 4 is a plot showing the loss of the light sum (fading) depending on the storage time of the phosphor, with the storage time t in days being plotted on the X-axis and the stored light sum S and intnesity J of the maxima of the thermoluminescence curve being plotted on the Y-axis.

The curve 1 for the dependence of the light sum of the X-rayed phosphor on the storage time is shown in FIG. 4.

The curve J for the dependence of the amplitude of the first band of the thermoluminescence curve of the X-rayed phosphor on the storage time is shown in FIG. 4.

The curve K for the dependence of the amplitude of the second band of the thermoluminescence curve of the X-rayed phosphor on the storage time is shown in FIG. 4.

EXAMPLE 9

A powder of lithium fluoride is taken, and to which lithium fluoride 5.85 wt.% of calcium fluoride and 0.04 wt.% of cerium fluoride are added. A solid cylinder is grown from the resulting mixture under vacuum by using a method similar to that of Stockbarger. The thus grown cylinder 10 mm in diameter is cut into pellets 1 mm thick along a plane normal to its axis, which are then ground and polished.

The thermophosphor thusly prepared contains 3 wt.% of calcium and 0.03 wt.% of cerium.

The lower limit of exposure doses measured on solid (monolitic) specimens of the thermophosphor is $3 \times 10^{-4}$ $r$.

For measuring small doses of the ionizing radiation use should be made of solid (monolithic) pellets only, in which tribo- and chemoluminescence phenomena are practically absent.

The herein-proposed thermophosphor based on lithium fluoride with additions of calcium and cerium has the following main characteristics:

1. The practical lower limit of the measured exposure doses is $3 \times 10^{-4}$ $r$.
2. The radiation spectrum has two bands in the ultraviolet range (300 – 350 nm).
3. The fading during a 10-day storage period of the X-rayed thermophosphor does not exceed 35% if measured by the light sum; if measured by the amplitude method, the respective figures for the first and second maxima are 60 and less than 10%.
4. The effective atomic number of the thermophosphor based on lithium fluoride having concentrations of 3 wt.% of calcium and 0.03 wt.% of cerium is 9.33, i.e. it does not exceed 15% of that of the lithium fluoride.

We claim:

1. A lithium fluoride thermophosphor, consisting essentially of lithium fluoride, from about 0.5 to about 3 weight percent of calcium and from about 0.015, to about 0.1 weight percent of cerium said phosphor exhibiting an ultraviolet thermoluminescent spectrum.

2. The thermophosphor as claimed in claim 1, which contains calcium in an amount of from about 1 to about 3 weight percent and cerium in an amount of from about 0.015 to about 0.06 weight percent respectively.

3. A thermophosphor as claimed in claim 1 in the form of a cylindrical pellet 10 mm in diameter and 1 mm thick.

* * * * *